United States Patent
Chao

(10) Patent No.: US 9,179,205 B2
(45) Date of Patent: Nov. 3, 2015

(54) WATERPROOF GATE HAVING SPEAKER MESH FILM

(71) Applicant: GETAC TECHNOLOGY CORPORATION, Hsinchu County (TW)

(72) Inventor: Po-Tsun Chao, Taipei (TW)

(73) Assignee: Getac Technology Corporation, Hsinchu County (TW)

( * ) Notice: Subject to any disclaimer, the term of this patent is extended or adjusted under 35 U.S.C. 154(b) by 77 days.

(21) Appl. No.: 14/265,281

(22) Filed: Apr. 29, 2014

(65) Prior Publication Data

US 2015/0172798 A1   Jun. 18, 2015

Related U.S. Application Data

(60) Provisional application No. 61/917,285, filed on Dec. 17, 2013.

(51) Int. Cl.
*H04R 1/02* (2006.01)
*H04B 1/3888* (2015.01)
*H04M 1/02* (2006.01)

(52) U.S. Cl.
CPC .............. *H04R 1/023* (2013.01); *H04B 1/3888* (2013.01); *H04M 1/0202* (2013.01)

(58) Field of Classification Search
CPC .............................. H04R 2499/11; H04R 5/02
USPC ......................................................... 381/334
See application file for complete search history.

(56) References Cited

U.S. PATENT DOCUMENTS 6,658,132 B1 * 12/2003 Moster ................ A61G 7/0507
381/189

\* cited by examiner

*Primary Examiner* — Simon King

(57) ABSTRACT

A waterproof gate having a speaker mesh film is provided and applied to a case, and the case is formed with a slot. The waterproof gate includes that a waterproof unit is plugged in the slot and has a partition plate having two opposite surfaces being respectively extended with a first annular piece and a second annular piece, and the partition plate is formed with an opening; a speaker mesh film unit covers the opening; a first fasten member is disposed and fastened in a first recess defined by the first annular piece and the partition plate; and a second fasten member is disposed and fastened in a second recess defined by the second annular piece and the partition plate. The speaker mesh film unit and the partition plate are clamped between the first fasten member and the second fasten member. Accordingly, an excellent waterproof effect is provided.

15 Claims, 8 Drawing Sheets

WATERPROOF GATE HAVING SPEAKER MESH FILM

BACKGROUND OF THE INVENTION

1. Field of the Invention

The present invention relates to a waterproof structure for an electronic device, especially to a waterproof gate having a speaker mesh film.

2. Description of Related Art

A portable electronic device such as a notebook computer, a mobile phone, a watch, a walkman, a camera or a personal digital assistance has become a must-have item in our lives. As such, the portable electronic device would be subject to various environments such as shopping malls, party scenes, mountains, rivers or seashores when the user takes the portable electronic device with him/her. Accordingly, the portable electronic device is required to be provided with excellent dustproof and waterproof effects.

At present, the means for enabling the portable electronic device to be provided with the dustproof and waterproof effects is to directly design a dustproof and waterproof case on the portable electronic device, or to store the portable electronic device in an external sealed case. For allowing the speaker installed in the case of the portable electronic device to smoothly transmit audio to the exterior and avoiding the problems of poor audio quality, sound distortion and sound breaking, the case of the portable electronic device or the external sealed case is formed with an opening and a waterproof air-permeable film, wherein the opening is arranged with the speaker correspondingly, and the waterproof air-permeable film is adhered on the case and served to seal the opening.

However, the arrangement of directly adhering the waterproof air-permeable film on the case has following disadvantages. Firstly, the waterproof performance of the case of the portable electronic device or the external sealed case is determined by the adhering status of the waterproof air-permeable film and the case. As such, if the adhering status of the waterproof air-permeable film and the case is failed, the waterproof performance of the case of the portable electronic device and the external sealed case would be no loner provided. Secondly, the case of the portable electronic device or the external sealed case is often subject to a friction force or a shaking force, the waterproof air-permeable film is very likely to be released from the case, thereby reducing waterproof performance of the case of the portable electronic device or the external sealed case to fail.

In view of what has been disclosed above, the applicant of the present invention has devoted himself for improving the above-mentioned disadvantages.

SUMMARY OF THE INVENTION

The present invention is to provide a waterproof gate having a speaker mesh film, in which a speaker mesh film unit and a partition plate are clamped by a first fasten member and a second fasten member. Accordingly, the waterproof gate having the speaker mesh film is provided with a stable and excellent waterproof effect.

Accordingly, the present invention provides a waterproof gate having a speaker mesh film, which is applied to a case, wherein the case is formed with a slot, the waterproof gate includes: a waterproof unit, plugged in the slot and having a partition plate, wherein two opposite surfaces of the partition plate are respectively extended with a first annular piece and a second annular piece, and a first recess is defined by the first annular piece and the partition plate, a second recess is defined by the second annular piece and the partition plate, and the partition plate is formed with at least an opening; a speaker mesh film unit, covered on the at least one opening; a first fasten member, disposed and fastened in the first recess; and a second fasten member, disposed and fastened in the second recess, wherein the speaker mesh film unit and the partition plate are clamped between the first fasten member and the second fasten member.

Advantages achieved by the present invention are illustrated as follows:

Firstly, the waterproof unit is plugged in the slot of the case, and the partition plate of the waterproof unit is formed with the opening, the speaker mesh film unit covers the opening, thereby allowing the case to be provided with effects of dustproof and waterproof, and a speaker stored in the case is enabled to smoothly transmit sound to the exterior through the opening and the speaker mesh film unit.

Secondly, the waterproof unit is made of an elastic material, and the first fasten member and the second fasten member are clamped corresponding to two sides of the speaker mesh film unit and the partition plate, thereby preventing the dustproof and waterproof performance of the waterproof gate from being affected by the insufficient adhering.

Thirdly, when the case is subject to a friction force or a shaking force, the speaker mesh film unit and the partition plate can still be stably clamped between the first fasten member and the second fasten member, thereby allowing to the waterproof gate to be provided with excellent dustproof and waterproof functions.

Fourthly, the waterproof unit is made of an elastic material, and the first fasten member and the second fasten member are made of a rigid material, so the first fasten member and the second fasten member are able to reinforce the strength of the waterproof gate, thereby allowing the waterproof gate to be formed with an excellent structural strength and enhancing the structural stability and prolonging the service life of the waterproof gate.

Fifthly, the waterproof unit is made of an elastic material, so when the outer periphery of the first fasten member is slightly larger than the inner periphery of the first annular piece and the outer periphery of the second fasten member is slightly larger than the inner periphery of the second annular piece, the inner periphery of the first annular piece would be abutted against the outer periphery of the first fasten member and the inner periphery of the second annular piece would be abutted against the outer periphery of the second fasten member, thereby further enhancing the dustproof performance and waterproof performance of the waterproof gate.

Sixthly, the outer periphery of the waterproof unit is extended with at least one water checking ring, the water checking ring is abutted against the case and slightly deformed for matching the contour of the case, thereby allowing the water checking ring to be in tight contact with the case, so the dustproof and waterproof effects of the waterproof gate can be further enhanced.

Seventhly, the speaker mesh film unit is formed with a waterproof speaker mesh film and an adhesive film, wherein the adhesive film is adhered between the waterproof speaker mesh film and the partition plate, thereby allowing the waterproof speaker mesh film to be tightly adhered on the partition plate through the adhesive film, so the dustproof and waterproof effects of the waterproof gate can be further enhanced.

Eighthly, the waterproof gate can be composed of simple components for allowing the waterproof gate to be provided with the effects of dustproof and waterproof, so the waterproof gate has advantages of simple in components and easy in assembly.

Ninthly, the thickness of the first fasten member is smaller than the thickness of the second fasten member, thereby allowing the thickness of the assembled waterproof gate to be greatly reduced and thus the case and the waterproof gate are provided with an advantage of thin in thickness.

Tenthly, the waterproof gate of the present invention further includes a speaker net, wherein the speaker net corresponding to the second fasten member is covered, and the speaker net is disposed at the outer side of the speaker mesh film unit for protecting the speaker mesh film unit, thereby preventing the speaker mesh film unit from being damaged and broken by an external foreign object.

Eleventhly, the waterproof gate is provided with a function of easily opening or covering the slot, so the waterproof gate has an advantage of convenient in use.

DETAILED DESCRIPTION OF THE INVENTION

Figure 1:
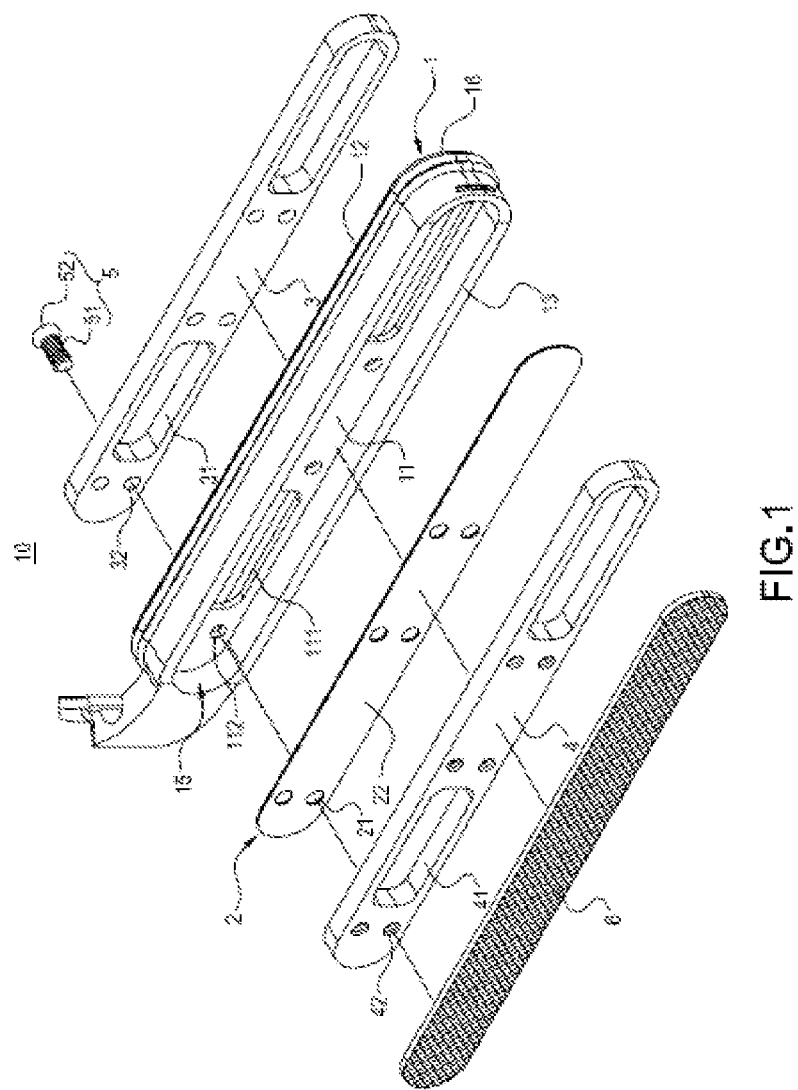
FIG. 1 is a perspective exploded view showing the waterproof gate according to one embodiment of the present invention.

Preferred embodiments of the present invention will be described with reference to the drawings.

Please refer to FIG. 1 to FIG. 7, the present invention provides a waterproof gate 10 having a speaker mesh film. The waterproof gate 10 includes a waterproof unit 1, a speaker mesh film unit 2, a first fasten member 3 and a second fasten member 4.

The waterproof gate 10 is applied to a case 100. The case 100 can be formed as an external sealed case for enclosing and storing an electronic device, or the case 10 can be formed as a case of an electronic device for enclosing and storing electric components of the electronic device. The electronic device can be a notebook computer, a mobile phone, a watch, a walkman, a camera or a personal digital assistance (PDA). The case 100 is formed with a slot 101.

Figure 2:
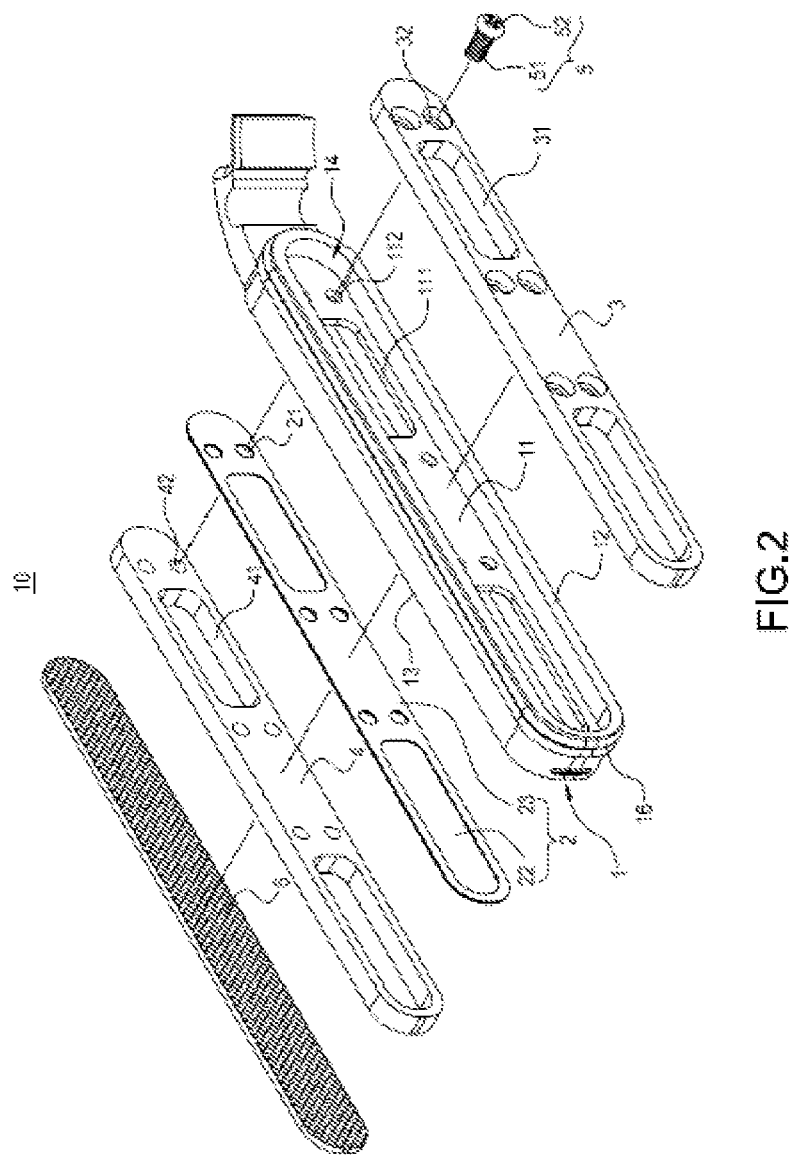
FIG. 2 is another perspective exploded view showing the waterproof gate according to one embodiment of the present invention.
Figure 6:
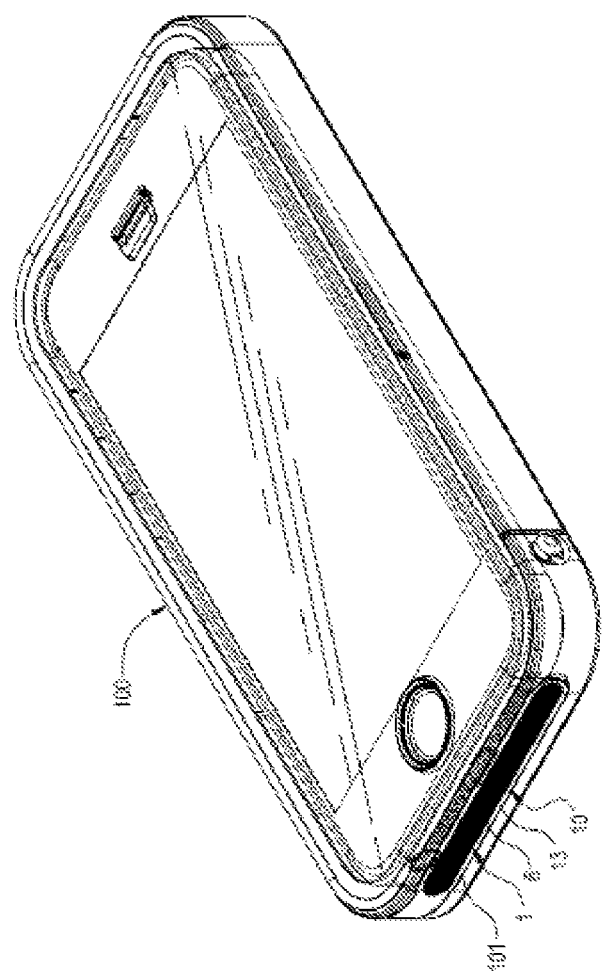
FIG. 6 is a schematic view illustrating the operation of the waterproof gate according to one embodiment of the present invention.
Figure 7:
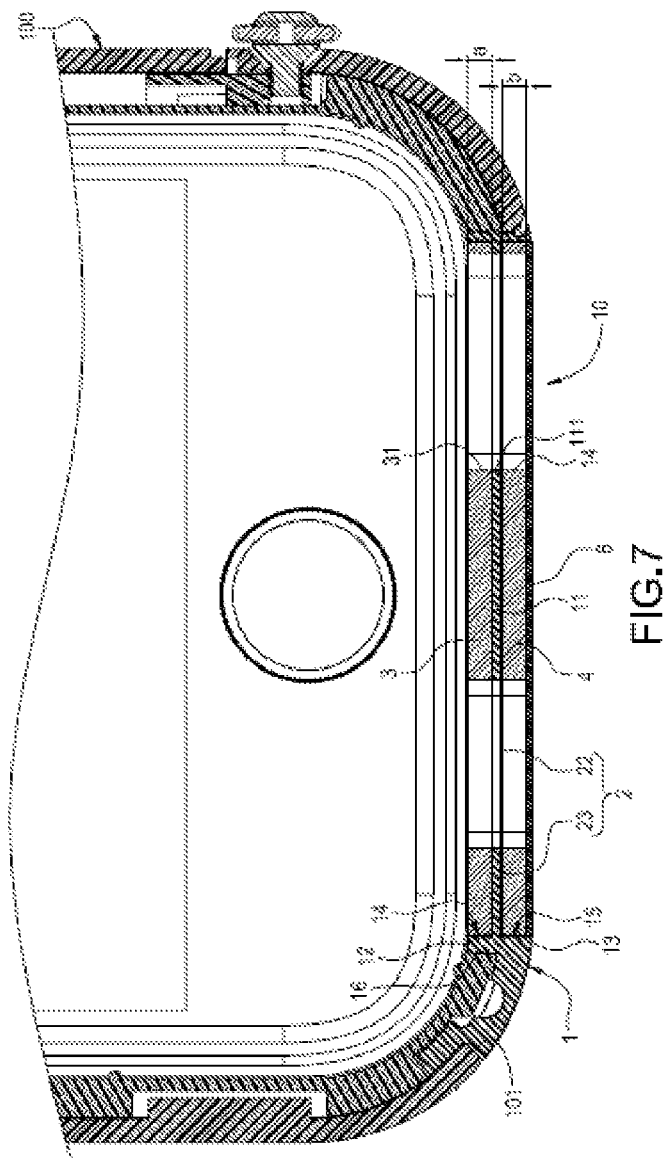
FIG. 7 is another schematic view illustrating the operation of the waterproof gate according to one embodiment of the present invention.

Please refer to FIG. 6 and FIG. 7. FIG. 6 is a schematic view illustrating the operation of the waterproof gate according to one embodiment of the present invention, and FIG. 7 is another schematic view illustrating the operation of the waterproof gate according to one embodiment of the present invention. The waterproof unit 1 is disposed and plugged in the slot 101. As shown in FIG. 1 and FIG. 2, wherein FIG. 1 is a perspective exploded view showing the waterproof gate according to one embodiment of the present invention, and FIG. 2 is another perspective exploded view showing the waterproof gate according to one embodiment of the present invention. The waterproof unit 1 has a partition plate 11. Two opposite surfaces of the partition plate 11 are respectively extended with a first annular piece 12 and a second annular piece 13. A first recess 14 is defined by the first annular piece 12 and the partition plate 11. A second recess 15 is defined by the second annular piece 13 and the partition plate 11.

In addition, the partition plate 11 is formed with one or a plurality of openings 111 and a plurality of through holes 112. The outer periphery of the waterproof unit 1 is extended with one or a plurality of water checking rings 16, wherein the water checking ring 16 is abutted against the case 100 (as shown in FIG. 6 and FIG. 7). According to this embodiment, the quantity of the opening 111 and the quantity of the water checking ring 16 are both two, but the quantities are not limited to the present invention.

Figure 4:
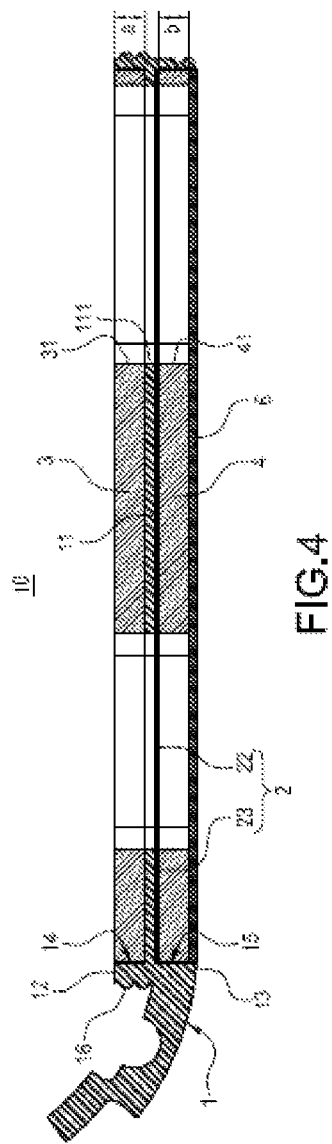
FIG. 4 is a cross sectional view showing the waterproof gate according to one embodiment of the present invention.

As shown in FIG. 4, which is a cross sectional view showing the waterproof gate according to one embodiment of the present invention. The speaker mesh film unit 2 covers the opening 111. The speaker mesh film unit 2 is made of a waterproof air-permeable material, thereby allowing the speaker mesh film unit 2 to be provided with effects of waterproof and sound transmitting, wherein the speaker mesh film unit 2 is formed with a plurality of penetrated holes 21.

Moreover, according to this embodiment, the waterproof unit 1 is made of an elastic material such as rubber and silicon. The first fasten member 3 and the second fasten member 4 are made of a rigid material such as metal or plastic or other materials.

Figure 5:
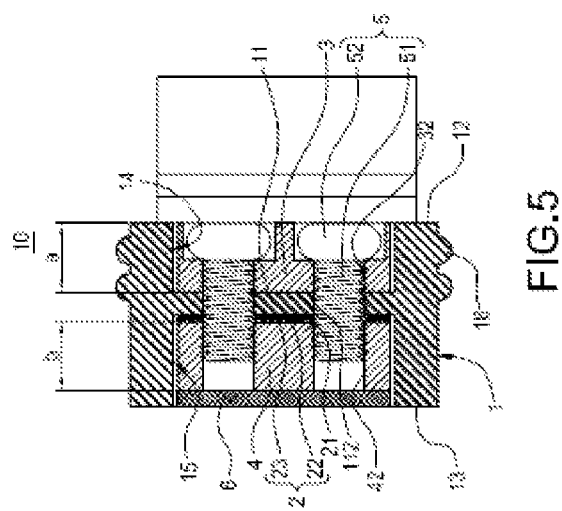
FIG. 5 is another cross sectional view showing the waterproof gate according to one embodiment of the present invention.

As shown in FIG. 2, FIG. 4 and FIG. 5, wherein FIG. 5 is another cross sectional view showing the waterproof gate according to one embodiment of the present invention; in assembly, the first fasten member 3 is disposed and fastened in the first recess 14. The first fasten member 3 is formed with first hollow openings 31 having the same quantity as the opening 111, and each of the first hollow openings 31 is arranged with each of the openings 111 correspondingly.

As shown in FIG. 1, FIG. 3, FIG. 4 and FIG. 7, the second fasten member 4 is disposed and fastened in the second recess 15 and exposed outside the slot 101. The second fasten member 4 is formed with second hollow openings 41 having the same quantity as the opening 111, and each of the second hollow openings 41 is arranged with each of the openings 111 correspondingly. Again, the second fasten member 4 is further formed with a plurality of penetrated holes 42, the inner periphery of each of the penetrated holes 42 is formed with an inner thread. In addition, the first fasten member 3 is also formed with a plurality of penetrated holes 32 corresponding to the penetrated holes 42 of the second fasten member 4. The thickness A of the first fasten member 3 is smaller than the thickness B of the second fasten member 4.

Figure 3:
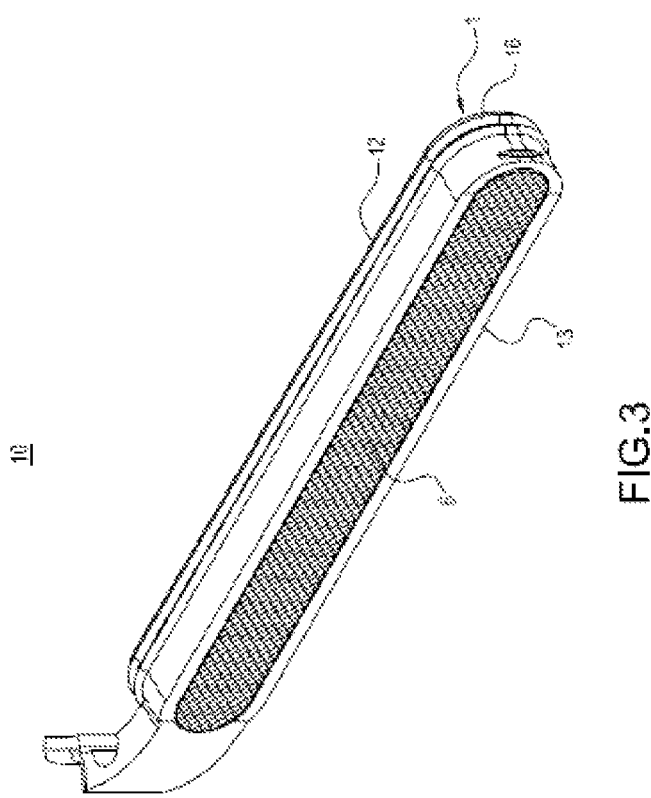
FIG. 3 is a perspective view showing the assembly of the waterproof gate according to one embodiment of the present invention.

The speaker mesh film unit 2 and the partition plate 11 are clamped between the first fasten member 3 and the second fasten member 4. As shown in FIG. 3 and FIG. 5, the speaker mesh film unit 2 can be clamped between the partition plate 11 and the second fasten member 4, or the speaker mesh film unit 2 can also be clamped between the partition plate 11 and the first fasten member 3, wherein the speaker mesh film unit 2 comprises a waterproof speaker mesh film 22 and an adhesive film 23. The adhesive film 23 is adhered between the waterproof speaker mesh film 22 and the partition plate 11.

In addition, according to this embodiment, the assembly of the waterproof unit 1, the first fasten member 3 and the second fasten member 4 can be processed with two following manners:

Firstly, the waterproof unit 1 is made of an elastic material, so when the outer periphery of the first fasten member 3 is slightly larger than the inner periphery of the first annular piece 12 and the outer periphery of the second fasten member 4 is slightly larger than the inner periphery of the second annular piece 13, the inner periphery of the first annular piece 12 would be abutted against the outer periphery of the first fasten member 3 and the inner periphery of the second annular piece 13 would be abutted against the outer periphery of the second fasten member 4.

Secondly, when the outer periphery of the first fasten member 3 is slightly smaller than the inner periphery of the first annular piece 12 and the outer periphery of the second fasten member 4 is slightly smaller than the inner periphery of the second annular piece 13, the inner periphery of the first annular piece 12 would not be abutted against the outer periphery of the first fasten member 3 and the inner periphery of the second annular piece 13 would not be abutted against the outer periphery of the second fasten member 4.

As shown in FIG. 1, FIG. 2 and FIG. 5, the waterproof gate 10 of the present invention further includes a plurality of screw members 5, each of the screw members 5 is formed with a screw rod 51. Each of the screw rods 51 is penetrated in each of the penetrated holes 32, each of the through holes 112 and each of the penetrated holes 42 thereby enabling the first fasten member 3, the second fasten member 4 and the waterproof unit 1 to be fastened at relative locations with a screwing means.

As shown in FIG. 1, FIG. 2 and FIG. 5, the waterproof gate 10 of the present invention further includes a speaker net 6. The speaker net 6 covers the second fasten member 4, wherein the speaker net 6 has one or a plurality of hollow slots. The shape and the quantity of the hollow slot can be determined according to actual needs, and what shall be addressed is that the scope of the present invention is not limited by the shape and the quantity of the hollow slot.

As shown in FIGS. 1-3, and FIGS. 6-7, the assembly of the waterproof gate 10 of the present invention is illustrated as follows. The waterproof unit 1 is plugged in the slot 101. The waterproof unit 1 has the partition plate 11. Two opposite surfaces of the partition plates 11 are respectively extended with the first annular piece 12 and the second annular piece 13. The first recess 14 is defined by the first annular piece 12 and the partition plate 11. The second recess 15 is defined by the second annular piece 13 and the partition plate 11. The partition plate 11 is formed with the openings 111. The speaker mesh film unit 2 covers the opening 111. The first fasten member 3 is disposed and fastened in the first recess 14. The second fasten member 4 is disposed and fastened in the second recess 15. The speaker mesh film unit 2 and the partition plate 11 are clamped between the first fasten member 3 and the second fasten member 4. Accordingly, the speaker mesh film unit 2 allows the waterproof gate 10 to be provided with a stable and excellent waterproof performance.

As shown in FIG. 5 to FIG. 7, the waterproof unit 1 is plugged in the slot 101 of the case 100, and the partition plate 11 of the waterproof unit 1 is formed with the openings 111. The speaker mesh film unit 2 covers the opening 111, and thus the case 100 has effects of dustproof and waterproof, and a speaker stored in the case 100 is enabled to smoothly transmit sound to the exterior through the openings 111 and the speaker mesh film unit 2.

As shown in FIG. 7, the waterproof unit 1 is made of an elastic material. When the speaker mesh film unit 2 and the partition plate 11 are clamped between the first fasten member 3 and the second fasten member 4, the first fasten member 3 and the second fasten member 4 clamp the partition plate 11 such that the partition plate 11 may be slightly deformed. Then the partition plate 11 is able to be recovered towards the second fasten member 4 and abutted against the speaker mesh film unit 2. As such, under the circumstance of the speaker mesh film unit 2 and the partition plate 11 being clamped by the first fasten member 3 and the second fasten member 4, the speaker mesh film unit 2 and the partition plate 11 are able to be in tight contact with each other and no gap is formed therebetween, thereby allowing the speaker mesh film unit 2 to stably cover and seal the openings 111. Accordingly, the dustproof and waterproof performance of the waterproof gate 10 is prevented from being affected by the insufficient adhering of the speaker mesh film unit 2.

As shown in FIG. 3 and FIG. 7, the first fasten member 3 is disposed and fastened in the first recess 14. The second fasten member 4 is disposed and fastened in the second recess 15. The waterproof unit 1 is made of an elastic material. The first fasten member 3 and the second fasten member 4 are made of a rigid material. Because the strength and the hardness of the material of the waterproof unit 1 are weaker than that of the first fasten member 3 and the second fasten member 4, the first fasten member 3 and the second fasten member 4 are fastened in the waterproof unit 1, thereby enabling the first fasten member 3 and the second fasten member 4 to reinforce the strength and the hardness of the waterproof unit 1. Thus, the waterproof gate 10 has an excellent structural strength and the structural stability and the service life of the waterproof gate 10 can also be enhanced.

As shown in FIG. 3 and FIG. 7, the waterproof unit 1 is made of an elastic material, so when the outer periphery of the first fasten member 3 is slightly larger than the inner periphery of the first annular piece 12 and the outer periphery of the second fasten member 4 is slightly larger than the inner periphery of the second annular piece 13, the inner periphery of the first annular piece 12 would be abutted against the outer periphery of the first fasten member 3 and the inner periphery of the second annular piece 13 would be abutted against the outer periphery of the second fasten member 4, and the first recess 14 is fully plugged and sealed by the first fasten member 3 and the second recess 15 is fully plugged and sealed by the second fasten member 4. Thus, external dusts, mist and water fail to enter the first recess 14 and the second recess 15, so the waterproof and the dustproof performance can be further enhanced.

As shown in FIG. 7, the waterproof unit 1 is made of an elastic material. The outer periphery of the waterproof unit 1 is extended with the water checking rings 16. Because the outer periphery of the water checking ring 16 is slightly larger than the inner periphery of the slot 101, when the waterproof unit 1 is plugged in the slot 101, the water checking ring 16 is abutted against the case 100 and slightly deformed for matching the contour of the case 100, thereby allowing the water checking ring 16 to be in tight contact with the case 100, and no gap is formed due to the tight contact between the water checking ring 16 and the case 100, so the dustproof and waterproof effects of the waterproof gate 10 can be further enhanced.

As shown in FIG. 4 and FIG. 5, the speaker mesh film unit 2 comprises the waterproof speaker mesh film 22 and the adhesive film 23. The adhesive film 23 is adhered between the waterproof speaker mesh film 22 and the partition plate 11, thereby allowing the waterproof speaker mesh film 22 to be tightly adhered on the partition plate 11 through the adhesive film 23, so the speaker mesh film unit 2 is enabled to stably cover and seal the openings 111, and thus the dustproof and waterproof effects of the waterproof gate 10 can be further enhanced.

As shown in FIG. 5, the waterproof gate 10 of the present invention further includes the screw members 5. Each of the screw members 5 is penetrated in each of the penetrated holes 32, each of the through holes 112 and each of the penetrated holes 42, thereby the speaker mesh film unit 2 and the partition plate 11 can be clamped respectively by screwing the first fasten member 3 and the second fasten member 4. Thus, the waterproof gate 10 can be composed of simple components for allowing the waterproof gate 10 to be provided with the effects of dustproof and waterproof, so the waterproof gate 10 has advantages of simple in components and easy in assembly.

In addition, the inner periphery of the penetrated hole 42 of the second fasten member 4 is formed with the inner thread. For allowing the screw rod 51 and the penetrated hole 42 to be stably screwed, the second fasten member 4 is required to be formed with a certain thickness. The inner periphery of the penetrated hole 32 of the first fasten member 3 is not formed with an inner thread, so the thickness of the first fasten member 3 is not relevant to the screw members 5. As such, the thickness A of the first fasten member 3 can be smaller than the thickness B of the second fasten member 4, thereby allowing the thickness of the assembled waterproof gate 10 to be greatly reduced. Thus, the case 100 and the waterproof gate 10 are provided with an advantage of thin in thickness.

As shown in FIG. 6 and FIG. 7, the waterproof gate 10 of present invention further includes the speaker net 6. The second fasten member 4 is exposed outside the slot 101. The speaker net 6 covers the second fasten member 4, so the speaker net 6 is able to be disposed at the outer side of the speaker mesh film unit 2 for protecting the speaker mesh film unit 2. When an external foreign object approaches the speaker mesh film unit 2, the speaker net 6 is able to stop the foreign object, thereby preventing the speaker mesh film unit 2 from being damaged and broken by the foreign object.

Figure 8:
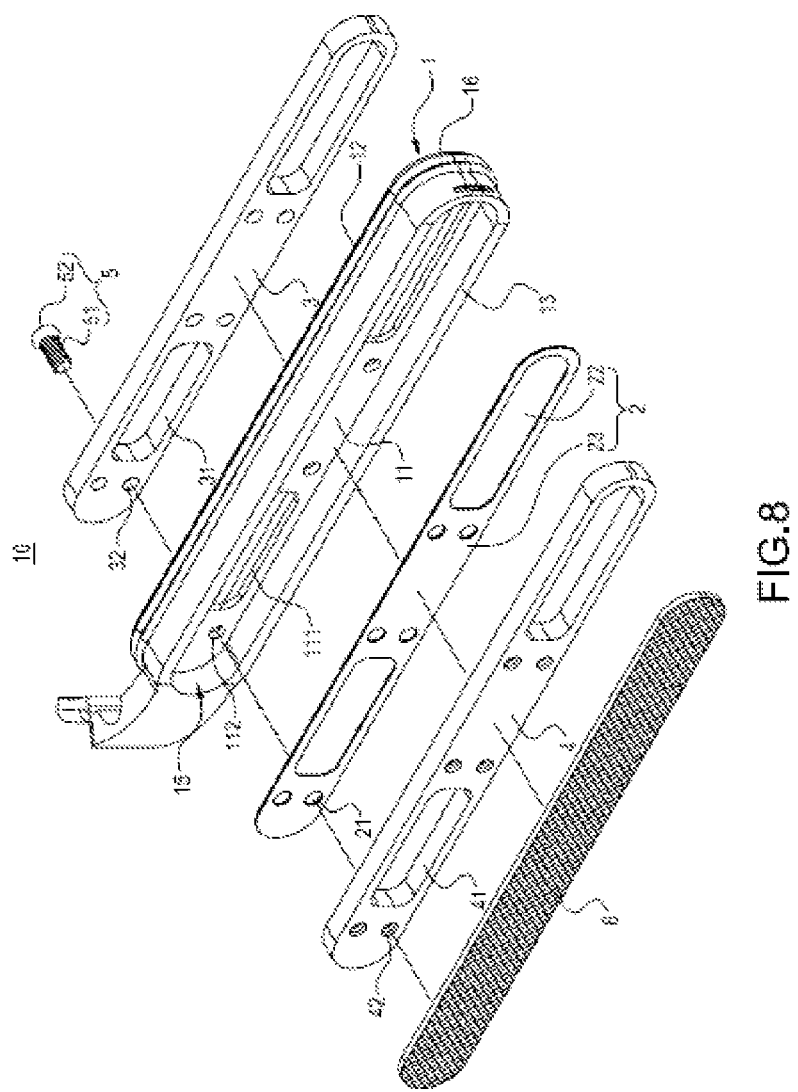
FIG. 8 is a perspective exploded view showing the waterproof gate according to another embodiment of the present invention.

Please refer to FIG. 8, which is a perspective exploded view showing the waterproof gate according to another embodiment of the present invention. As shown from FIG. 1 to FIG. 7, the speaker mesh film unit 2 is received in the second recess 15 and clamped between the partition plate 11 and the second fasten member 4. The speaker mesh film unit 2 comprises the waterproof speaker mesh film 22 and the adhesive film 23. The adhesive film 23 is adhered between the waterproof speaker mesh film 22 and the partition plate 11. As shown in FIG. 8, the adhesive film 23 can also be adhered between the waterproof speaker mesh film 22 and the second fasten member 4. The two adhering locations of the adhesive film 23 can be selectively adopted according to actual needs.

In addition, when the speaker mesh film unit 2 is received in the first recess 14 and clamped between the partition plate 11 and the first fasten member 3, the adhesive film 23 can be adhered between the waterproof speaker mesh film 22 and the partition plate 11, or the adhesive film 23 can also be adhered between the waterproof speaker mesh film 22 and the first fasten member 3.

Based on what has been disclosed above, the waterproof gate having the speaker mesh film provided by the present invention is novel and more practical in use comparing to prior art.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A waterproof gate having a speaker mesh film, applied to a case formed with a slot, and including:
   a waterproof unit, plugged in the slot and having a partition plate, wherein two opposite surfaces of the partition plate are respectively extended with a first annular piece and a second annular piece, and a first recess is defined by the first annular piece and the partition plate, a second recess is defined by the second annular piece and the partition plate, and the partition plate is formed with at least an opening;
   a speaker mesh film unit, covering the at least one opening;
   a first fasten member, disposed and fastened in the first recess; and
   a second fasten member, disposed and fastened in the second recess, wherein the speaker mesh film unit and the partition plate are clamped between the first fasten member and the second fasten member.

2. The waterproof gate having the speaker mesh film according to claim 1, wherein the waterproof unit is made of an elastic material.

3. The waterproof gate having the speaker mesh film according to claim 1, wherein the waterproof unit is made of an elastic material, and the first fasten member and the second fasten member are made of a rigid material.

4. The waterproof gate having the speaker mesh film according to claim 3, wherein the inner periphery of the first annular piece is abutted against the outer periphery of the first fasten member, and the inner periphery of the second annular piece is abutted against the outer periphery of the second fasten member.

5. The waterproof gate having the speaker mesh film according to claim 3, wherein the outer periphery of the waterproof unit is extended with at least one water checking ring, wherein the at least one water checking ring is abutted against the case.

6. The waterproof gate having the speaker mesh film according to claim 1, wherein the first fasten member is formed with at least a first hollow opening corresponding to the at least one opening, and the second fasten member is formed with at least a second hollow opening corresponding to the at least one opening.

7. The waterproof gate having the speaker mesh film according to claim 1, wherein the speaker mesh film unit is received in the second recess and clamped between the partition plate and the second fasten member.

8. The waterproof gate having the speaker mesh film according to claim 7, wherein the speaker mesh film unit comprises a waterproof speaker mesh film and an adhesive film, and the adhesive film is adhered between the waterproof speaker mesh film and the second fasten member.

9. The waterproof gate having the speaker mesh film according to claim 1, wherein the speaker mesh film unit comprises a waterproof speaker mesh film and an adhesive film, and the adhesive film is adhered between the waterproof speaker mesh film and the partition plate.

10. The waterproof gate having the speaker mesh film according to claim 1, further including a plurality of screw members, wherein the partition plate is formed with a plurality of through holes, the first fasten member is formed with a plurality of penetrated holes, the second fasten member is formed with a plurality of penetrated holes, and the screw members are penetrated in the through holes, the penetrated holes of the first fasten member and the penetrated holes of the second fasten member.

11. The waterproof gate having the speaker mesh film according to claim 10, wherein each of the screw members is formed with a screw rod, the inner periphery of each of the penetrated holes of the second fasten member is formed with an inner thread, and the screw rods are penetrated in the through holes, the penetrated holes of the first fasten member and the penetrated holes of the second fasten member so as to be screw-fitted with the inner threads.

12. The waterproof gate having the speaker mesh film according to claim 11, wherein the thickness of the first fasten member is smaller than the thickness of the second fasten member.

13. The waterproof gate having the speaker mesh film according to claim 1, further including a speaker net, wherein the second fasten member is exposed outside the slot, and the speaker net covers the second fasten member correspondingly.

14. The waterproof gate having the speaker mesh film according to claim 1, wherein the speaker mesh film unit is received in the first recess and clamped between the partition plate and the first fasten member.

15. The waterproof gate having the speaker mesh film according to claim 14, wherein the speaker mesh film unit comprises a waterproof speaker mesh film and an adhesive film, and the adhesive film is adhered between the waterproof speaker mesh film and the first fasten member.

\* \* \* \* \*